(12) United States Patent
Subramony et al.

(10) Patent No.: US 10,699,033 B2
(45) Date of Patent: Jun. 30, 2020

(54) SECURE ENABLEMENT OF PLATFORM FEATURES WITHOUT USER INTERVENTION

(71) Applicant: Advanced Micro Devices, Inc., Sunnyvale, CA (US)

(72) Inventors: Mahesh Subramony, Austin, TX (US); Daniel L. Bouvier, Bee Cave, TX (US)

(73) Assignee: Advanced Micro Devices, Inc., Santa Clara, CA (US)

(*) Notice: Subject to any disclaimer, the term of this patent is extended or adjusted under 35 U.S.C. 154(b) by 246 days.

(21) Appl. No.: 15/636,384

(22) Filed: Jun. 28, 2017

(65) Prior Publication Data
US 2019/0005271 A1 Jan. 3, 2019

(51) Int. Cl.
| | |
|---|---|
| *G06F 21/70* | (2013.01) |
| *G06F 21/85* | (2013.01) |
| *H04L 9/08* | (2006.01) |
| *G06F 21/57* | (2013.01) |
| *G06F 9/4401* | (2018.01) |
| *H04L 9/32* | (2006.01) |
| *G06F 21/62* | (2013.01) |
| *G06F 21/71* | (2013.01) |

(52) U.S. Cl.
CPC ............ *G06F 21/85* (2013.01); *G06F 9/4401* (2013.01); *G06F 9/4416* (2013.01); *G06F 21/575* (2013.01); *G06F 21/629* (2013.01); *G06F 21/6218* (2013.01); *G06F 21/70* (2013.01); *G06F 21/71* (2013.01); *H04L 9/0838* (2013.01); *H04L 9/3234* (2013.01); *G06F 2221/2149* (2013.01); *G06Q 2220/18* (2013.01)

(58) Field of Classification Search
CPC .... G06F 21/70; G06F 21/629; G06Q 2220/18
See application file for complete search history.

(56) References Cited

U.S. PATENT DOCUMENTS

| | | | |
|---|---|---|---|
| 4,333,090 | A | 6/1982 | Hirsch |
| 4,479,112 | A | 10/1984 | Hirsch |
| 7,835,521 | B1 | 11/2010 | Pinheiro |
| 8,020,215 | B2 | 9/2011 | Nam |

(Continued)

OTHER PUBLICATIONS

International Search Report and Written Opinion in International Application No. PCT/US2015/051346, dated Jan. 8, 2016, 9 pages.

*Primary Examiner* — Thaddeus J Plecha
(74) *Attorney, Agent, or Firm* — Kowert Hood Munyon Rankin and Goetzel PC; Rory D. Rankin (57) ABSTRACT

Systems, apparatuses, and methods for secure enablement of platform features without user intervention are disclosed. In one embodiment, a system includes at least a motherboard and a processor. The motherboard includes at least a socket and an authentication component. The authentication component can be a chipset, expansion I/O device, or other component. The processor is installed in the socket on the motherboard. During a boot sequence, the processor retrieves a key value from the authentication component and then authenticates the key value. Next, the processor determines which one or more features to enable based on the key value. Then, the processor programs one or more feature control registers to enable the one or more features specified by the key value. Accordingly, during normal operation of the system, the one or more features will be enabled.

20 Claims, 6 Drawing Sheets

(56) References Cited

U.S. PATENT DOCUMENTS

| | | |
|---|---|---|
| 8,340,290 B2 | 12/2012 | Kang |
| 9,471,799 B2 | 10/2016 | Schiffman et al. |
| 2002/0078342 A1* | 6/2002 | Matthews, Jr. ..... H04L 63/0428 713/151 |
| 2003/0159053 A1 | 8/2003 | Fauble et al. |
| 2006/0004928 A1* | 1/2006 | Hess ................. G06F 21/10 710/8 |
| 2006/0195907 A1 | 8/2006 | Delfs |
| 2008/0104416 A1* | 5/2008 | Challener ............ H04L 9/3236 713/189 |
| 2009/0119221 A1 | 5/2009 | Weston |
| 2009/0217374 A1* | 8/2009 | Liu ..................... G06F 21/85 726/19 |
| 2010/0017840 A1* | 1/2010 | Akins, III ........... H04N 7/1675 725/131 |
| 2011/0154011 A1* | 6/2011 | Efraim ................ G06F 21/572 713/100 |
| 2012/0254598 A1* | 10/2012 | Mikuszewski ...... G06F 9/44505 713/1 |
| 2012/0272059 A1 | 10/2012 | Shetty |
| 2013/0007466 A1 | 1/2013 | Saranghar |
| 2013/0073849 A1 | 3/2013 | Wang |
| 2013/0145475 A1 | 6/2013 | Ryu |
| 2013/0266141 A1 | 10/2013 | Kim |
| 2014/0181529 A1 | 6/2014 | Joyce, III |
| 2015/0227723 A1* | 8/2015 | Tylik .................. G06F 21/12 726/26 |
| 2015/0381368 A1* | 12/2015 | Stevens, Jr. .......... G06Q 30/04 705/40 |
| 2016/0188868 A1* | 6/2016 | Otturu ................ G06F 9/44505 713/1 |
| 2017/0235928 A1* | 8/2017 | Desai .................. G06F 21/105 713/2 |

\* cited by examiner

SECURE ENABLEMENT OF PLATFORM FEATURES WITHOUT USER INTERVENTION

BACKGROUND

Description of the Related Art

In some computing systems, features of the different components of the system can be enabled or disabled on a case by case basis depending on the features purchased by the end user. A personal computer (PC) desktop system is an example of this type of computing system. PC desktop systems are typically composed of a central processing unit (CPU), graphics processing unit (GPU), memory controller, system peripherals (e.g., network interface, storage, universal serial bus (USB) ports), system control functions (i.e., southbridge), and other components. A typical desktop system usually has a processor socket on the motherboard to allow a late addition of the processor in the manufacturing assembly flow.

PC motherboards have traditionally included a southbridge for managing various input/output (I/O) interfaces. A southbridge can also be referred to as a chipset. However, much of the functionality of the southbridge is now being integrated within the processor, and the motherboard no longer has a control point for inventory tracking. Additionally, it is common for processors or other chips (e.g., system-on-chips (SoCs)) to have different capabilities which can be purchased by a user for additional expense. Typically, these chips have fuses which are set to enable or disable certain capabilities, based on what the user purchases. However, setting fuses results in having many different stock keeping units (SKUs) for a given chip, which can increase the complexity of inventory management of the chip.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for secure enablement of platform features without user intervention are disclosed herein. In one embodiment, a system includes at least a motherboard and a processor. The motherboard includes at least a socket and an authentication component. The processor is installed in the socket on the motherboard. The processor retrieves a key value from the authentication component during the boot sequence and then authenticates the key value. In one embodiment, the authentication component is a chipset. In another embodiment, the authentication component is an expansion I/O device.

Next, the processor determines which one or more features to enable based on the retrieved key value. Then, the processor programs one or more feature control registers to enable the one or more features specified by the key value. In one embodiment, the feature control registers are only writeable by the processor. Accordingly, during operation of the system, the one or more features will be enabled on the processor. In one embodiment, a first feature which is enabled or disabled depending on the key value is overclocking of the processor. In one embodiment, the processor includes a security processor configured to implement a secure boot mechanism.

In one embodiment, a processor enables a first set of features responsive to retrieving a first key value from the authentication component. In this embodiment, the same processor enables a second set of features responsive to retrieving a second key value from the authentication component, wherein the second set of features is different from the first set of features. This allows a processor to have different features enabled based on which motherboard the processor is installed on, with the authentication component on the motherboard storing the key value which specifies which features are enabled. The authentication component can also allow for better inventory control mechanisms to track the inventory of motherboards available for sale. For example, using the methods and mechanisms described herein, only authentic motherboards with a valid key will allow the processor to properly boot. In addition, in various embodiments the methods and mechanisms described herein enable the capabilities of a computing system to be controlled based on the motherboard assembly. Further, the methods and mechanisms described herein ensure that the motherboard has been validated by the processor vendor using a secure control mechanism. For example, if the motherboard does not include the proper authentication hardware, the processor will fail to boot. Accordingly, failing the authentication check during boot will result in a non-functional processor. Thus, by providing that interlock and tracking the number of authentication chips sold, the processor vendor can keep track of the number of processors sold, features enabled, and so on. This also allows the processor vendor to better manage inventory when planning for future processor versions.

Figure 1:
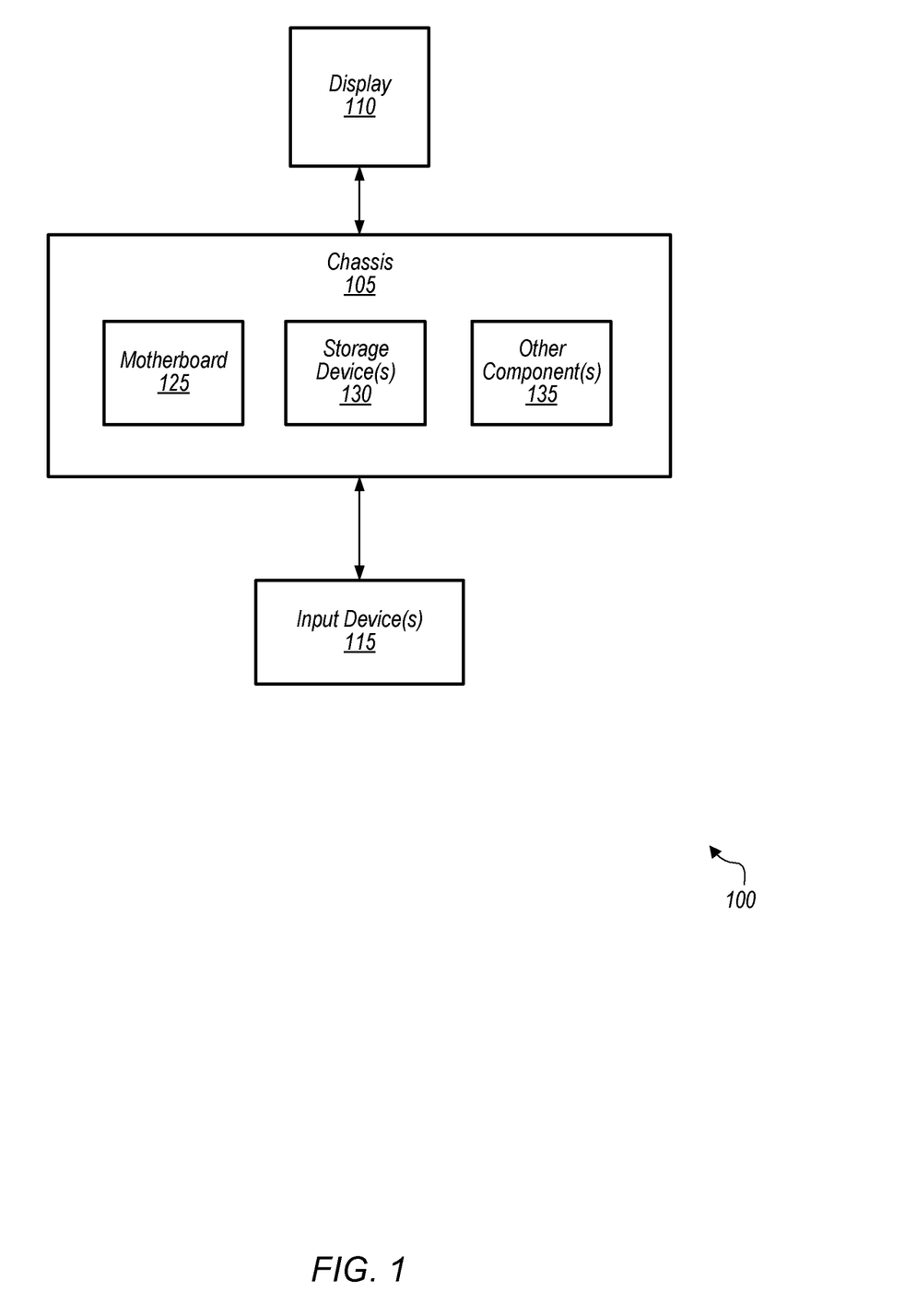
FIG. 1 is a block diagram of one embodiment of a computing system.

Referring now to FIG. 1, a block diagram of one embodiment of a computing system 100 is shown. In one embodiment, computing system 100 includes a chassis 105, display 110, and one or more input devices 115. Chassis 105 is representative of any type of case or chassis for housing the various circuit boards, power supplies, and other components of computing system 100. Display 110 can be any type of display (e.g., touchscreen, monitor, flatscreen) which can vary according to the embodiment. Input devices 115 are representative of any number and type (e.g., touchscreen, mouse, keyboard) of devices for interfacing with computing system 100. Chassis 105 includes motherboard 125, storage device(s) 130, and other component(s) 135. Storage device(s) 130 are representative of any number and type (e.g., solid state drive (SSD), hard disk drive (HDD)) of storage devices. Component(s) 135 can include a power supply, fan, battery, and/or other devices not installed or soldered on motherboard 125.

In one embodiment, motherboard 125 includes a central processing unit (CPU) connected to a southbridge or platform controller hub (PCH). The CPU can also be connected to one or more memory devices, peripheral devices, one or more graphics processing units (GPUs), and/or other components. The southbridge connects any number of peripheral component interconnect (PCI) or PCI Express (PCI-e) devices through PCI or PCI-e buses to the CPU. In other embodiments, other bus protocols other than PCI or PCI-e can be utilized on motherboard 125 to provide connections between components.

In one embodiment, the processor of motherboard 125 is configured to implement a secure boot sequence. During the secure boot sequence, the processor retrieves a key value stored on one of the other components soldered on motherboard 125. After authenticating the key value, the processor determines which features should be enabled on the processor and/or motherboard 125 based on the key value and/or other data retrieved from an authentication component. Then, the processor programs one or more feature control registers to enable these specified features. These features will then be enabled during operation of computing system 100 once the secure boot sequence is completed. Computing system 100 can be any type of computing system (e.g., desktop computer, server, laptop, mobile device) depending on the embodiment. In other embodiments, computing system 100 can include one or more other components and/or be structured in other suitable manners.

Figure 2:
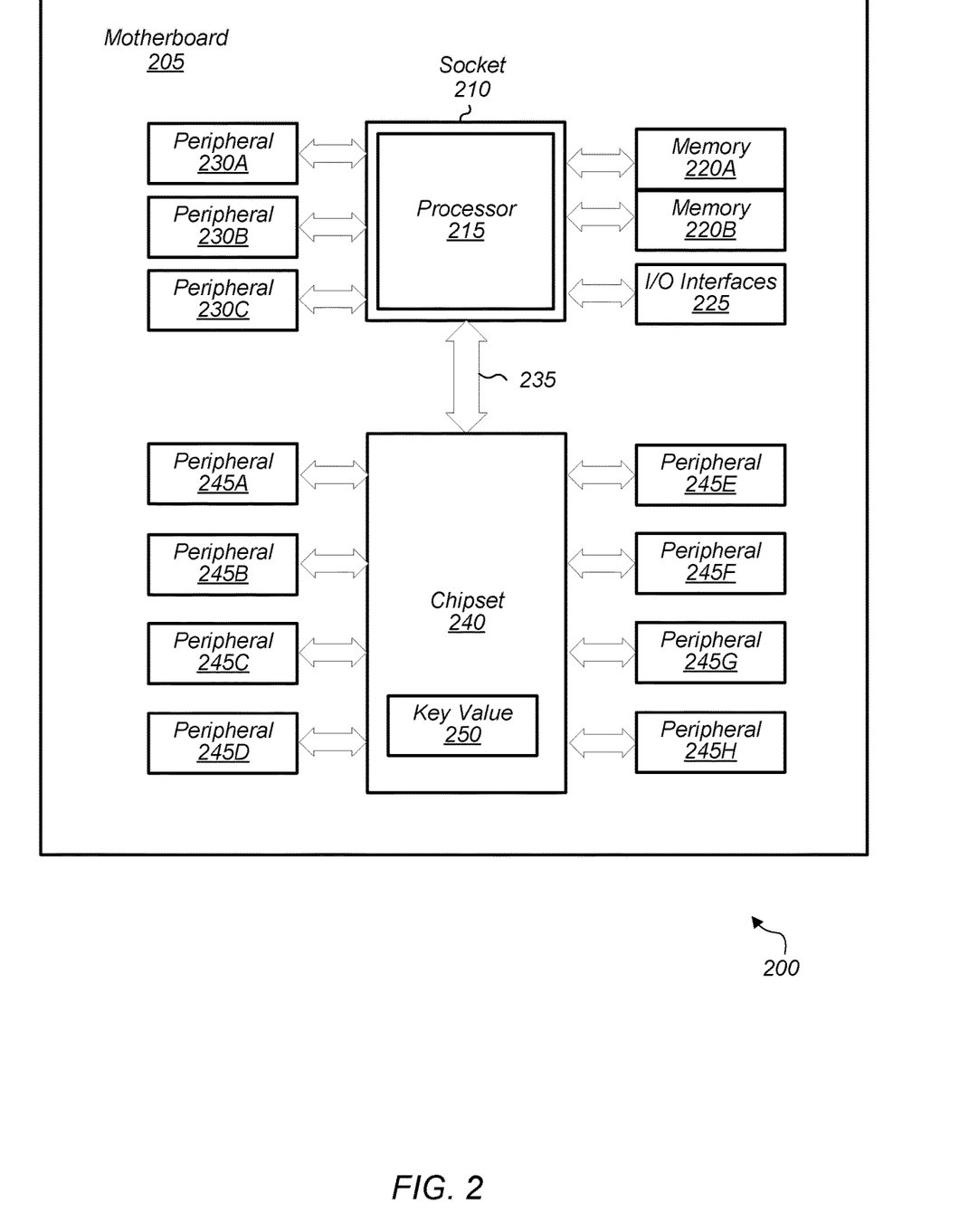
FIG. 2 is a block diagram of one embodiment of a computing system with a motherboard.

Turning now to FIG. 2, a block diagram of one embodiment of a computing system 200 with a motherboard 205 is shown. In one embodiment, motherboard 205 includes at least socket 210, memories 220A-B, I/O interfaces 225, peripherals 230A-C, bus 235, chipset 240, and peripherals 245A-H. Processor 215 is representative of any number and type of processing units (e.g., central processing unit (CPU), graphics processing unit (GPU), digital signal processor (DSP), field programmable gate array (FPGA), application specific integrated circuit (ASIC)). It is noted that processor 215 can also be referred to as a system on chip (SoC).

In one embodiment, processor 215 is inserted into socket 210. In one embodiment, when processor 215 is inserted into socket 210, processor 215 includes all of its features enabled by default. Processor 215 determines which features are enabled during the boot sequence, with the enabled features dependent on a key value 250 retrieved from chipset 240. In this way, the same physical processor 215 can be configured differently based on variations in the key value 250 stored by chipset 240.

Processor 215 is coupled to memory in memory slots 220A-B, which are representative of any number and type of memory slots. In one embodiment, the memory in memory slots 220A-B is implemented using random access memory (RAM). The RANI implemented can be static RAM (SRAM), dynamic RAM (DRAM), Resistive RAM (Re-RAM), Phase Change RAM (PCRAM), or any other volatile or non-volatile RAM. In one embodiment, memory in memory slots 220A-B includes dynamic random-access memory (DRAM) chips. The type of DRAM that is used includes (but is not limited to) double data rate (DDR) DRAM, DDR2 DRAM, DDR3 DRAM, and so forth.

Processor 215 is coupled to I/O interfaces 225 and various peripherals 230A-C (e.g., graphics processors, universal serial bus (USB) ports). Processor 215 is also coupled to chipset 240 via interface 235. In one embodiment, the interface 235 is a peripheral component interface express (PCI-E) interface. In other embodiments, interface 235 can be compliant with other standards.

Chipset 240 is coupled to peripherals 245A-N via various interfaces. Peripherals 245A-N are representative of any number and type of peripherals (e.g., network, storage, USB), I/O interfaces, slots, and so on that are coupled to chipset 240. For example, one or more of peripherals 245A-N can be USB ports, serial AT attachment (SATA) ports, PCI expansion I/O ports, etc. In one embodiment, chipset 240 also stores key value 250, which is used to authenticate motherboard 205 during the boot sequence executed by processor 215 on power-up. In other embodiments, key value 250 can be stored in other components. For example, in another embodiment, motherboard 205 can include an expansion I/O device or expansion device which contains key value 250.

In one embodiment, processor 215 is a generic processor which does not have its capabilities determined in advance (i.e., via fuses). Rather, in this embodiment, the capabilities which are enabled in processor 215 are determined by motherboard 205. For example, in one embodiment, chipset 240 includes a key value 250 which determines the capabilities which are enabled in processor 215. In this embodiment, processor 215 retrieves the key value 250 from chipset 240 via interface 235 during the boot sequence.

In one embodiment, bus 235 is a peripheral component interface (PCI) Express interface. In other embodiments, bus 235 can be any of various other types of bus interfaces. During the boot sequence, processor 215 is configured to search for the key value 250 in one or more possible locations. Processor 215 is configured to enable bus 235 and then search over bus 235 to find a key value 250. If key value 250 is not accessible on bus 235, processor 215 can search in one or more other locations for a key value.

After retrieving key value 250 from chipset 240 (or from another location), processor 215 authenticates key value 250. In one embodiment, the authentication mechanism involves processing key value 250 with a hash function. In other embodiments, other suitable authentication mechanisms can be utilized by processor 215 to authenticate key value 250. Then, after authenticating key value 250, processor 215 determines which features to enable based on key value 250 and/or additional information stored by chipset 240. In one embodiment, processor 215 programs one or more feature control registers (not shown) to enable the features specified by key value 250. These feature control registers are only writeable by processor 215. Then, processor 215 can finish the boot sequence and start normal operation of system 200. During operation of system 200, the features specified by key value 250 for processor 215 will be enabled.

In various embodiments, one of the features which is enabled or disabled during the boot sequence is overclocking. As used herein, the term "overclocking" is defined as increasing a component's clock frequency in order to operate the component at a higher speed than the component has been certified to run by the manufacturer. For example, in one embodiment, a system management unit (SMU) (not shown) reads a secure attribute bit stored in one of the feature control registers to determine whether overclocking is allowed. Then, the SMU writes a value into the power-state tables to change the frequency limits of processor 215. If overclocking is not allowed and the user writes a value that is greater than this value, the SMU can ignore the value and maintain the nominal overclocking capabilities of processor 215.

Another feature which can be enabled or disabled by processor 215 during the boot sequence is PCI-e port bifurcation. For example, in one embodiment, motherboard 205 includes a 16-lane PCI-e bus that can functionally be bifurcated into two independent 8-lane buses. In one embodiment, the two independent 8-lane buses could be used for dual-graphics card support. The SMU could detect whether bifurcation is supported and enable or disable the data structures limiting the capability. Other settings which can be programmed by the processor 215 based on the authentication mechanism implemented for key value 250 include performance limits, connectivity limits, memory limits, and so on. In other embodiments, other types of features in system 200 can be enabled or disabled based on key value 250.

Figure 3:
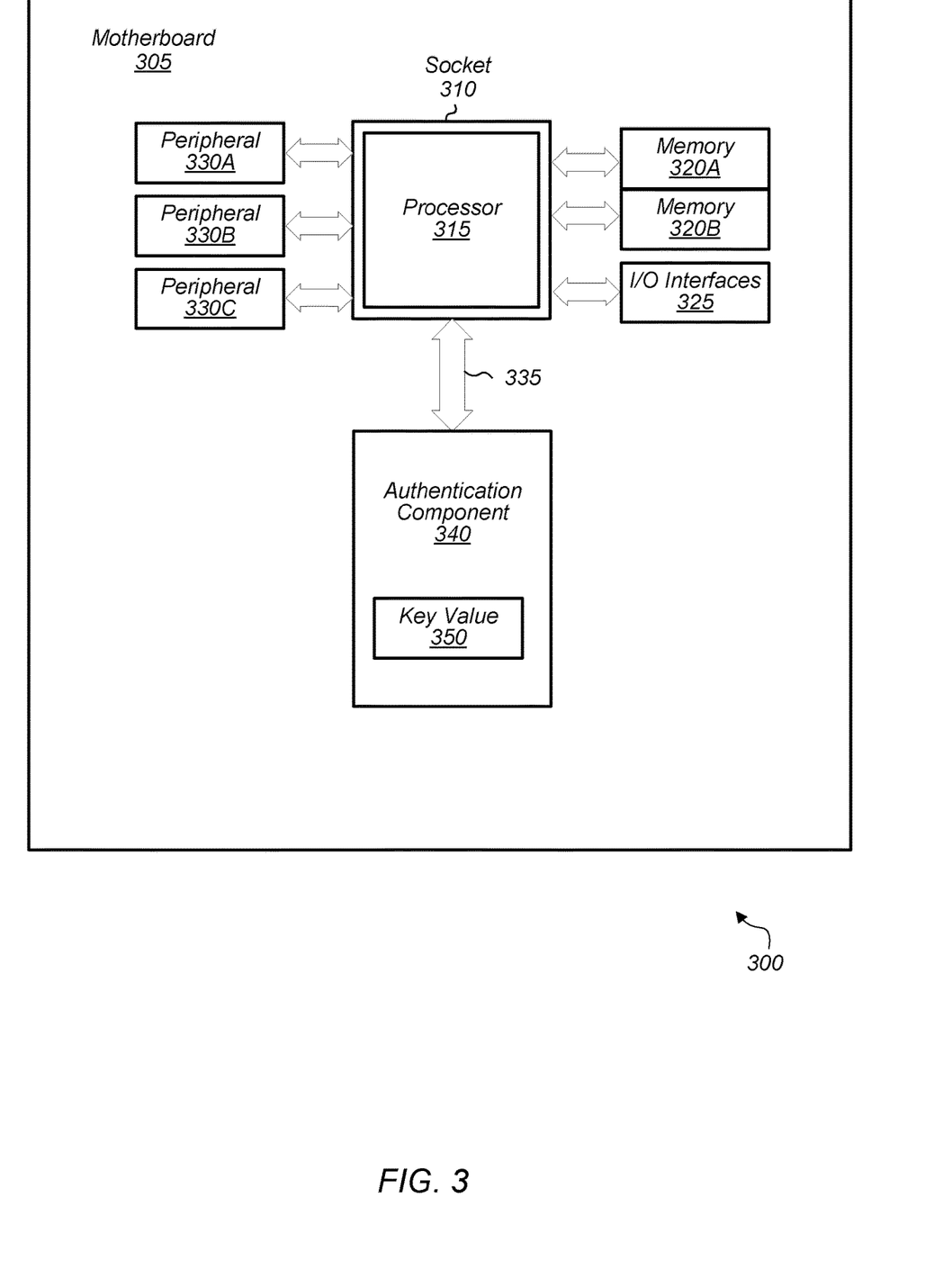
FIG. 3 is a block diagram of another embodiment of a computing system with a motherboard.

Referring now to FIG. 3, a block diagram of another embodiment of a computing system 300 with a motherboard 305 is shown. It is noted that computing system 300 is an alternate version of computing system 200 (of FIG. 2) for implementing the methods and mechanisms described herein. Processor 315 is coupled to memories 320A-B, I/O interfaces 325, peripherals 330A-C, and authentication component 340 via interface 335. Similar to computing system 100, processor 315 is inserted into socket 310 on motherboard 305. However, rather than having key value 350 stored in chipset 240 as in FIG. 2, motherboard 305 has key value 350 stored in an authentication component 340. In some computing systems, a portion or the entirety of the functionality of the chipset can be included within processor 315. For these types of computing systems, the key value 350 can be stored in a separate authentication component 340. In one embodiment, authentication component 340 is soldered to motherboard 305.

Similar to motherboards which store the key value in the chipset, processor 315 searches for and locates key value 350 during the boot sequence. Then, processor 315 authenticates key value 350 and then queries authentication component 340 to determine which features should be enabled on processor 315 and motherboard 305. Then, the processor 315 programs various feature control registers (not shown) to enable the features which are specified by authentication component 340.

Figure 4:
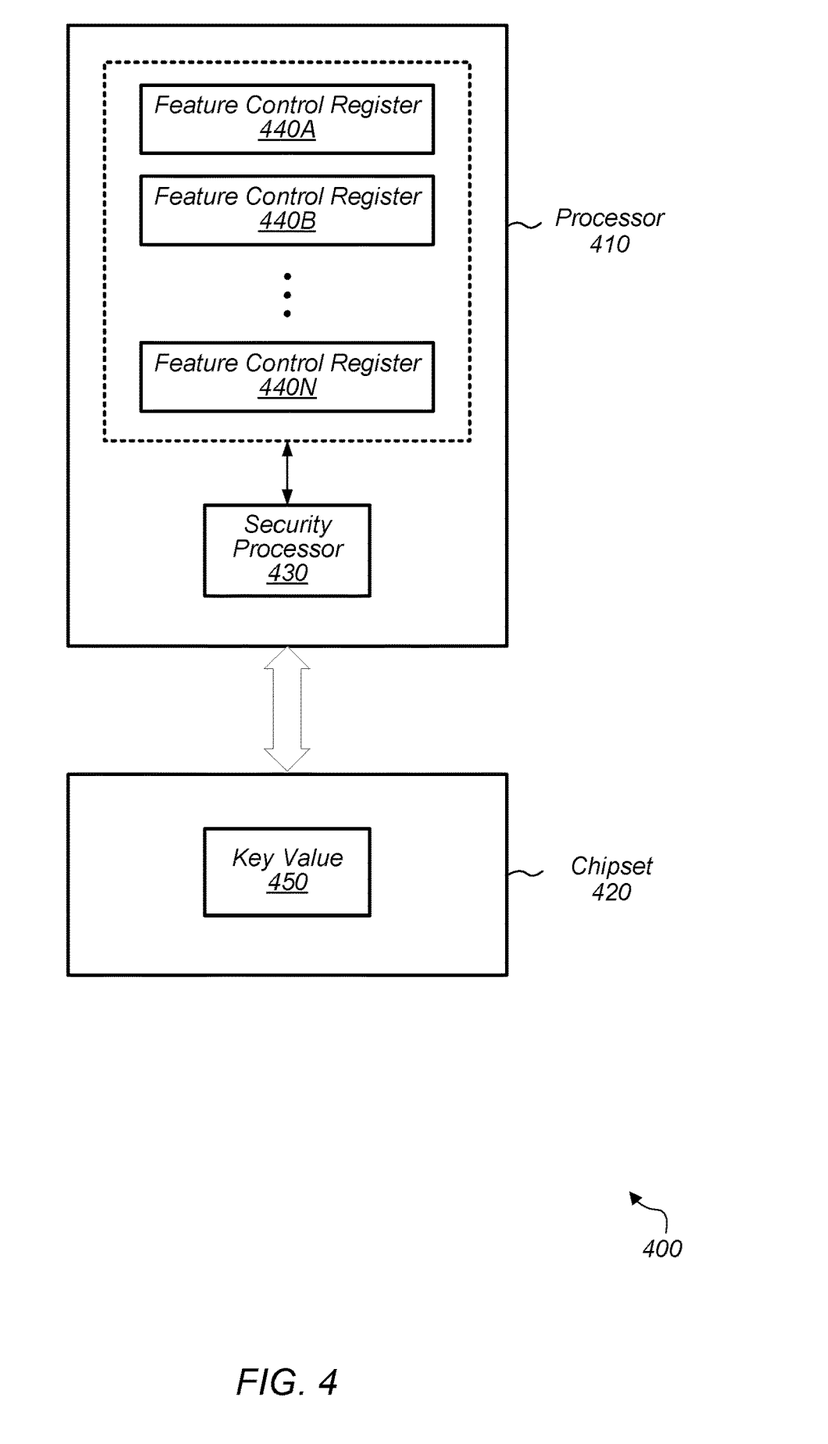
FIG. 4 is a block diagram of another embodiment of a computing system.

Turning now to FIG. 4, a block diagram of another embodiment of a computing system 400 is shown. In one embodiment, computing system 400 includes at least processor 410 and chipset 420. In one embodiment, processor 410 and chipset 420 are attached to a motherboard (not shown). In one embodiment, processor 410 is installed on a socket on the motherboard. Processor 410 is coupled to chipset 420 using any suitable type of bus, fabric, or interface. In one embodiment, processor 410 includes at least security processor 430 and feature control registers 440A-N, which are representative of any number of registers.

In one embodiment, security processor 430 is configured to manage the configuration and security of system 400. In various embodiments, security processor 430 is preloaded with any number of public/private encryption keys and/or generates any number and type of encryption keys. As used herein, the term "security processor" is defined as an apparatus configured to execute instructions for performing authentication and validation functions which provide security protection for system 400. Processor 410 is differentiated from security processor 430, with processor 410 executing operating system instructions, user application instructions, etc. An additional differentiating factor between processor 410 and security processor 430 is that security processor 430 includes one or more security-related mechanisms (e.g., random number generator, cryptographic coprocessor). Also, security processor 430 stores one or more unique encryption/decryption keys inaccessible to the rest of system 400. Accordingly, security processor 430 provides a hardware-based root of trust for system 400, allowing processor 410 to boot up system 400 in a secure environment.

For example, in one embodiment, security processor 430 manages the boot-up process of system 400 to ensure that system 400 boots up with authenticated boot code. Security processor 430 also manages various other functions associated with the boot-up process of system 400. In one embodiment, security processor 430 includes or is coupled to non-volatile memory which stores one or more portions of boot code which are executable by security processor 430. In one embodiment, when power is first applied to system 400, security processor 430 is configured to retrieve boot code from the non-volatile memory and store and authenticate the boot code into volatile memory. Security processor 430 is configured to authenticate the boot code using any of various authentication techniques, which can vary from embodiment to embodiment. For example, in one embodiment, security processor 430 performs authentication and validation of the boot code based on public key cryptography. In this embodiment, security processor 430 performs authentication by verifying a digital signature embedded in the boot code. Then, security processor 430 executes the boot code from volatile memory. This on-chip boot code is executable by security processor 430 to retrieve firmware from boot media. In other embodiments, security processor 430 can utilize other methods for implementing a secure boot mechanism.

In one embodiment, during the secure boot sequence, security processor 430 queries chipset 420 for a key value 450. After retrieving the key value 450 from chipset 420, security processor 430 authenticates the key value 450. After authenticating the key value 450, security processor 430 interrogates chipset 420 to determine which features should be enabled for this particular platform. Once security processor 430 determines from chipset 420 which features should be enabled, security processor 430 programs one or more of feature control registers 440A-N to cause these features to be enabled. Then, after the boot sequence is completed, these features will be enabled during normal operation of computing system 400.

Figure 5:
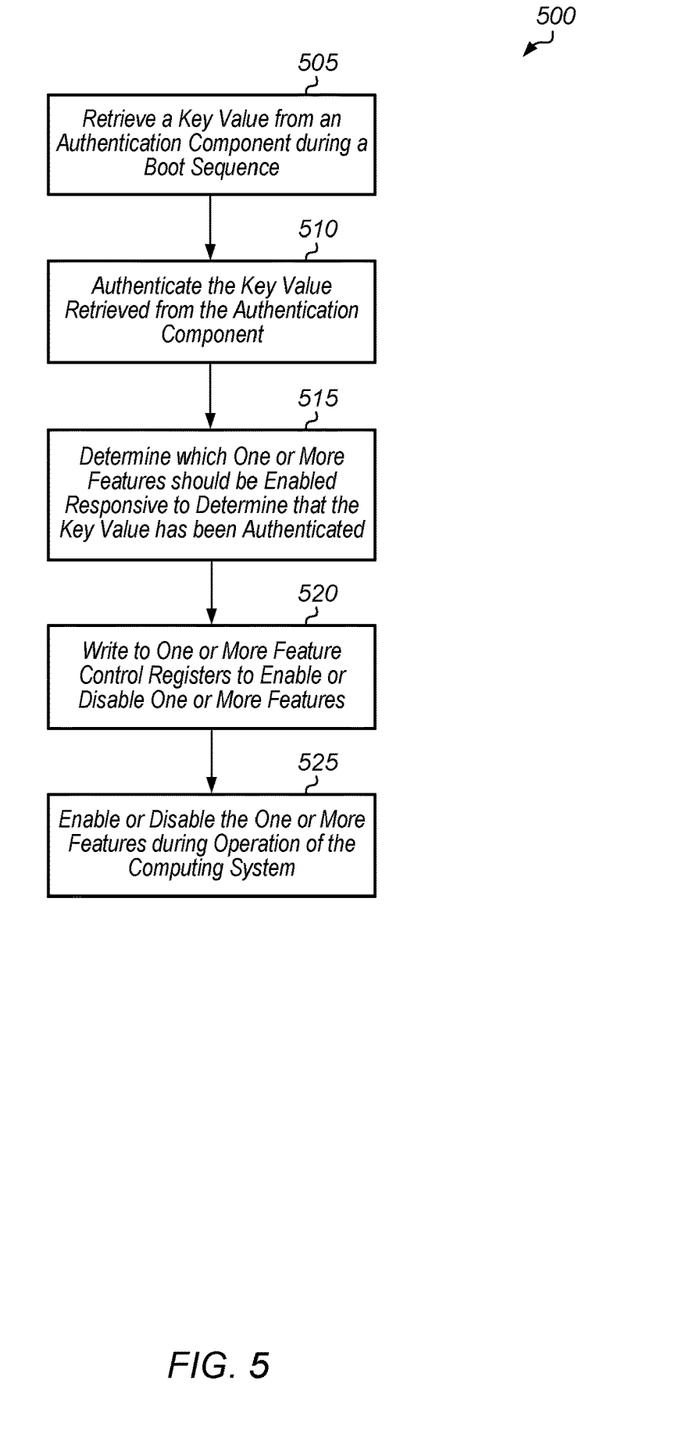
FIG. 5 is a generalized flow diagram illustrating one embodiment of a method for implementing secure enablement of platform features without user intervention.
Figure 6:
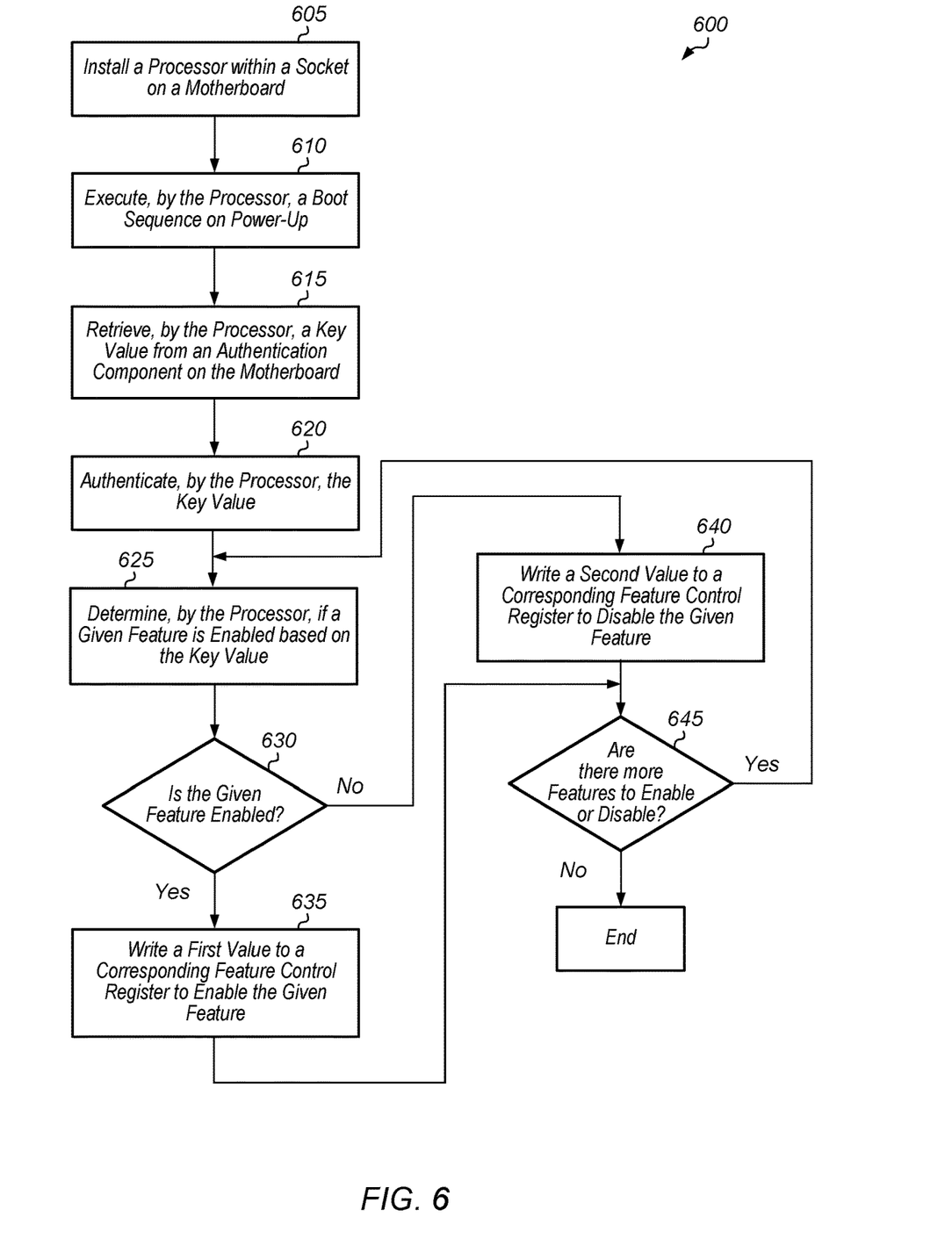
FIG. 6 is a generalized flow diagram illustrating one embodiment of a method for enabling different features of a processor based on an authentication value retrieved from a motherboard component.

Referring now to FIG. 5, one embodiment of a method 500 for implementing secure enablement of platform features without user intervention is shown. For purposes of discussion, the steps in this embodiment and those of FIG. 6 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A processor, of a computing system, retrieves a key value from an authentication component during a boot sequence (block 505). In one embodiment, the processor is inserted into a socket which is soldered on a motherboard of the computing system. In one embodiment, the authentication component is a chipset. In another embodiment, the authentication component is an expansion I/O component. In other embodiments, the authentication component can be other types of components which are installed on the motherboard.

Next, the processor authenticates the key value retrieved from the authentication component (block 510). The processor determines from the key value and/or the authentication component which one or more features of the processor and/or the motherboard should be enabled responsive to determining that the key value has been authenticated (block 515). In one embodiment, the one or more features include whether or not overclocking is enabled for the processor. Next, the processor writes to one or more feature control registers to enable or disable one or more features (block 520). Then, the one or more features are enabled or disabled during operation of the computing system (block 525). After block 525, method 500 ends.

Turning now to FIG. 6, one embodiment of a method 600 for enabling different features of a processor based on an authentication value retrieved from a motherboard component. A processor is installed within a socket on a motherboard (block 605). Next, the processor executes a boot sequence on power-up (block 610). Then, the processor retrieves a key value from an authentication component on the motherboard (block 615). Depending on the embodiment, the authentication component can be a chipset, expansion I/O device, or other type of component.

Next, the processor authenticates the key value (block 620). Assuming the key value is authenticated, the processor determines if a given feature is enabled based on the key value (block 625). If the given feature is enabled based on the key value (conditional block 630, "yes" leg), then the processor writes a first value to a corresponding feature control register to enable the given feature (block 635). If the given feature is disabled based on the key value (conditional block 630, "no" leg), then the processor writes a second value to the corresponding feature control register to disable the given feature (block 640). Then, the processor determines if there are more features to enable or disable (conditional block 645). If there are more features to enable or disable (conditional block 645, "yes" leg), then method 600 returns to block 625 to check) for the next feature. If there are no more features to enable or disable (conditional block 645, "no" leg), then method 600 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a processor comprising circuitry installed on a motherboard; and
    an authentication component comprising circuitry installed on the motherboard for managing input/output interfaces for the processor, wherein the authentication component is configured to maintain a key;
    wherein the processor is configured to:
        process a boot sequence for the system;
        retrieve the key from the authentication component while processing the boot sequence;
        authenticate the key;
        determine, from the key, which of one or more features of the processor to
        enable responsive to determining the key has been authenticated; and
        write to one or more feature control registers to enable the one or more features.

2. The system as recited in claim 1, wherein a first feature of the one or more features is overclocking the processor.

3. The system as recited in claim 1, wherein the processor is further configured to:
    determine from the key, which of one or more features of the motherboard to enable responsive to determining the key has been authenticated; and
    write to one or more feature control registers to enable the one or more features for the motherboard, wherein the one or more feature control registers are within the processor.

4. The system as recited in claim 1, wherein the processor is further configured to:
    enable a first set of features responsive to retrieving a first key value from the authentication component; and
    enable a second set of features responsive to retrieving a second key value from the authentication component, wherein the second set of features is different from the first set of features.

5. The system as recited in claim 1, wherein:
    the authentication component for managing input/output interfaces for the processor is soldered on a motherboard;
    the authentication component is a chipset; and
    the processor queries the authentication component after authenticating the key to determine the one or more features of the processor to enable.

6. The system as recited in claim 1, wherein:
    the authentication component for managing input/output interfaces for the processor is an expansion device; and
    the processor queries the authentication component after authenticating the key to determine the one or more features of the processor to enable.

7. The system as recited in claim 1, wherein the processor comprises a security processor, wherein the one or more feature control registers are writable only by the security processor.

8. A method comprising:
    maintaining, by an authentication component comprising circuitry installed on a motherboard for managing input/output interfaces for a processor, a key;
    processing, by the processor comprising circuitry installed on the motherboard, a boot sequence for a system;

retrieving, by the processor, the key from the authentication component while processing the boot sequence;

authenticating, by the processor, the key;

determining, from the key by the processor, which of one or more features of the processor to enable responsive to determining the key has been authenticated; and writing, by the processor, to one or more feature control registers to enable the one or more features.

9. The method as recited in claim 8, wherein a first feature of the one or more features is overclocking the processor.

10. The method as recited in claim 8, further comprising:

determining from the key, which of one or more features of the motherboard to enable responsive to determining the key has been authenticated; and writing to one or more feature control registers to enable the one or more features for the motherboard, wherein the one or more feature control registers are within the processor.

11. The method as recited in claim 8, further comprising:

enabling a first set of features responsive to retrieving a first key value from the authentication component; and enabling a second set of features responsive to retrieving a second key value from the authentication component, wherein the second set of features is different from the first set of features.

12. The method as recited in claim 8, wherein:

the authentication component for managing input/output interfaces for the processor is soldered on a motherboard;

the authentication component is a chipset; and the processor queries the authentication component after authenticating the key to determine the one or more features of the processor to enable.

13. The method as recited in claim 8, wherein:

the authentication component for managing input/output interfaces for the processor is an expansion device; and the processor queries the authentication component after authenticating the key to determine the one or more features of the processor to enable.

14. The method as recited in claim 8, wherein the processor comprises a security processor, wherein the one or more feature control registers are writable only by the security processor.

15. An apparatus installed on a motherboard comprising:

one or more feature control registers; and circuitry configured to:

process a boot sequence for a system;

retrieve, while processing the boot sequence, a key from an authentication component comprising circuitry installed on the motherboard for managing input/output interfaces for the apparatus;

authenticate the key;

determine, from the key, which of one or more features of the apparatus to enable responsive to determining the key has been authenticated; and write to the one or more feature control registers to enable the one or more features.

16. The apparatus as recited in claim 15, wherein a first feature of the one or more features is overclocking a component.

17. The apparatus as recited in claim 15, wherein the circuitry is further configured to:

determine from the key, which of one or more features of the motherboard to enable responsive to determining the key has been authenticated; and write to one or more feature control registers to enable the one or more features for the motherboard, wherein the one or more feature control registers are within the apparatus.

18. The apparatus as recited in claim 15, wherein the circuitry is further configured to:

enable a first set of features responsive to retrieving a first key value from the authentication component; and enable a second set of features responsive to retrieving a second key value from the authentication component, wherein the second set of features is different from the first set of features.

19. The apparatus as recited in claim 15, wherein:

the authentication component for managing input/output interfaces for the apparatus is soldered on a motherboard;

the authentication component is a chipset; and the apparatus queries the authentication component after authenticating the key to determine the one or more features of the apparatus to enable.

20. The apparatus as recited in claim 15, wherein:

the authentication component for managing input/output interfaces for the apparatus is an expansion device; and the apparatus queries the authentication component after authenticating the key to determine the one or more features of the apparatus to enable.

* * * * *